(12) United States Patent
Nagasawa et al.

(10) Patent No.: US 12,473,466 B2
(45) Date of Patent: Nov. 18, 2025

(54) ADHESIVE SHEET (71) Applicant: LINTEC CORPORATION, Tokyo (JP)

(72) Inventors: Toshiaki Nagasawa, Saitama (JP); Ayaka Seto, Saitama (JP); Kenta Yamazaki, Saitama (JP); Shinya Suzuki, Toda (JP)

(73) Assignee: LINTEC CORPORATION, Tokyo (JP)

( * ) Notice: Subject to any disclaimer, the term of this patent is extended or adjusted under 35 U.S.C. 154(b) by 200 days.

(21) Appl. No.: 18/260,801

(22) PCT Filed: Nov. 22, 2021

(86) PCT No.: PCT/JP2021/042731
§ 371 (c)(1),
(2) Date: Jul. 10, 2023

(87) PCT Pub. No.: WO2022/163086
PCT Pub. Date: Aug. 4, 2022

(65) Prior Publication Data
US 2024/0052209 A1    Feb. 15, 2024

(30) Foreign Application Priority Data

Jan. 27, 2021  (JP) .................................. 2021-011168

(51) Int. Cl.
*C09J 7/38* (2018.01)
*C09J 7/40* (2018.01)
*C09J 121/00* (2006.01)

(52) U.S. Cl.
CPC ................. *C09J 7/383* (2018.01); *C09J 7/40* (2018.01); *C09J 121/00* (2013.01);
(Continued)

(58) Field of Classification Search
CPC ... C09J 7/383; C09J 7/40; C09J 121/00; C09J 2301/122; C09J 2301/302; C09J 2401/006;
(Continued)

(56) References Cited

U.S. PATENT DOCUMENTS

| 2005/0196607 A1* | 9/2005 | Shih | .......................... B44C 1/16 |
| | | | 428/354 |
| 2012/0045604 A1* | 2/2012 | Gavel | ........................ C09J 7/29 |
| | | | 156/244.11 |

(Continued)

FOREIGN PATENT DOCUMENTS

| JP | 7-278509 A | 10/1995 |
| JP | 10-279891 A | 10/1998 |

(Continued)

OTHER PUBLICATIONS

International Search Report issued on Feb. 1, 2022 in PCT/JP2021/042731 (with English translation), 5 pages.
Written Opinion of the International Searching Authority issued on Feb. 1, 2022 in PCT/JP2021/042731 (with English translation), 8 pages.

*Primary Examiner* — Patricia L. Nordmeyer
(74) *Attorney, Agent, or Firm* — Oblon, McClelland, Maier & Neustadt, L.L.P.

(57) ABSTRACT

A pressure sensitive adhesive sheet may include a base material and a hot-melt pressure sensitive adhesive layer which contains a softener, and further include a barrier layer disposed between the base material and the hot-melt pressure sensitive adhesive layer, the barrier layer containing at least one selected from the group consisting of a polyester-based resin, a polyurethane-based resin, and a polyolefin-based resin. The polyester-based resin may be at least one of a polyester resin or a modified polyester resin.

9 Claims, 2 Drawing Sheets (52) U.S. Cl.
CPC .... *C09J 2301/122* (2020.08); *C09J 2301/302* (2020.08); *C09J 2401/006* (2013.01); *C09J 2423/001* (2013.01); *C09J 2423/006* (2013.01); *C09J 2467/001* (2013.01); *C09J 2475/001* (2013.01)

(58) Field of Classification Search
CPC ............ C09J 2423/001; C09J 2423/006; C09J 2467/001; C09J 2475/001; C09J 2400/283; C09J 2453/00; C09J 7/387; B32B 27/00
See application file for complete search history.

(56) References Cited

U.S. PATENT DOCUMENTS

2017/0283658 A1  10/2017  Tanaka
2020/0061968 A1   2/2020  Piran

FOREIGN PATENT DOCUMENTS

| | | |
|---|---|---|
| JP | 2003-129009 A | 5/2003 |
| JP | 2007-51449 A | 3/2007 |
| JP | 2017-179240 A | 10/2017 |
| JP | 2020-79863 A | 5/2020 |

* cited by examiner

ADHESIVE SHEET

CROSS-REFERENCE TO RELATED APPLICATIONS

The present application is the national stage of international application PCT/JP2021/042731, filed on Nov. 22, 2021, and claims the benefit of the filing date of Japanese Appl. No. 2021-011168, filed on Jan. 27, 2021.

TECHNICAL FIELD

The present invention relates to a pressure sensitive adhesive sheet.

BACKGROUND ART

Pressure sensitive adhesives exhibit excellent performance such as flexibility, elasticity, and pressure sensitive adhesion and have been widely used for use in pressure sensitive adhesive sheets. The production methods for the pressure sensitive adhesives have been generally solvent methods, in which a rubber or the like is dissolved in a solvent, the solution is applied to a base material, and then the solvent is dried by heating; however, the production method by this solvent method had issues such that a long time is required to dissolve the rubbers or the like in the solvent.

Therefore, in recent years, a hot-melt pressure sensitive adhesive that can be applied to a base material by heating and melting is suitably used (e.g., see Patent Documents 1 and 2).

CITATION LIST

Patent Literature

Patent Document 1: JP 2017-179240 A
Patent Document 2: JP 7-278509 A

SUMMARY OF INVENTION

Technical Problem

However, a pressure sensitive adhesive sheet in which a hot-melt pressure sensitive adhesive layer including a hot-melt pressure sensitive adhesive is formed on a base material had issues such as discoloration of a paper base material and deformation of a base material containing a polyolefin-based resin (curling, bending, elongation, and the like may occur).

As a result of studies conducted by the present inventors, it was found that a hot-melt pressure sensitive adhesive contains a softener such as a process oil to improve coatability and to exhibit pressure sensitive adhesion at low temperatures; however, when such a softener migrates from the hot-melt pressure sensitive adhesive layer to a base material, discoloration and deformation of the base material occur.

An object of the present invention is to provide a pressure sensitive adhesive sheet that can suppress discoloration and deformation of a base material by suppressing migration of a softener contained in a hot-melt pressure sensitive adhesive layer to the base material.

Solution to Problem

The present inventors found that the issues described above can be solved by providing a barrier layer containing at least one selected from the group consisting of a polyester-based resin, a polyurethane-based resin, and a polyolefin-based resin between a base material and a hot-melt pressure sensitive adhesive layer, and thus completed the present invention.

That is, the present invention provides the following [1] to [9].

[1] A pressure sensitive adhesive sheet including a base material and a hot-melt pressure sensitive adhesive layer containing a softener, the pressure sensitive adhesive sheet further including a barrier layer disposed between the base material and the hot-melt pressure sensitive adhesive layer, the barrier layer containing at least one selected from the group consisting of a polyester-based resin, a polyurethane-based resin, and a polyolefin-based resin, in which
the polyester-based resin is at least one of a polyester resin or a modified polyester resin.
[2] The pressure sensitive adhesive sheet according to [1] above, in which the polyester-based resin and the polyurethane resin each have a glass transition temperature of from 40 to 130° C., and the polyolefin resin has a softening point of from 0 to 100° C.
[3] The pressure sensitive adhesive sheet according to [1] above, in which the polyester-based resin has a glass transition temperature of from 20 to 100° C.
[4] The pressure sensitive adhesive sheet according to any one of [1] to [3] above, in which the base material contains at least one of paper or an olefin-based resin.
[5] The pressure sensitive adhesive sheet according to [4] above, in which the paper has a density of greater than 0.9 g/cm$^3$.
[6] The pressure sensitive adhesive sheet according to any one of [1] to [5] above, in which the barrier layer has a thickness of from 0.01 to 10 μm.
[7] The pressure sensitive adhesive sheet according to [1] or [3] above, in which the polyester-based resin has a glass transition temperature of from 30 to 90° C.
[8] The pressure sensitive adhesive sheet according to any one of [1] to [7] above, in which the hot-melt pressure sensitive adhesive layer is a layer containing a rubber and a tackifier.
[9] The pressure sensitive adhesive sheet according to any one of [1] to [8] above, further including a release liner on the hot-melt pressure sensitive adhesive layer on an opposite site of the barrier layer.

Advantageous Effects of Invention

According to the present invention, a pressure sensitive adhesive sheet that can suppress discoloration and deformation of a base material by suppressing migration of a softener contained in a hot-melt pressure sensitive adhesive layer to the base material can be provided.

DESCRIPTION OF EMBODIMENTS

In the present specification, the "weight average molecular weight" is a value measured by gel permeation chromatography (GPC) calibrated with polystyrene.

Furthermore, lower limits and upper limits described in series for a preferred numerical range (e.g., a range of content, etc.) can each be combined independently. For example, from the description "preferably from 10 to 90, more preferably from 30 to 60", the "preferred lower limit (10)" and the "preferred upper limit (60)" can be combined as "from 10 to 60".

Configuration of Pressure Sensitive Adhesive Sheet

The configuration of the pressure sensitive adhesive sheet according to an embodiment of the present invention is not particularly limited as long as the pressure sensitive adhesive sheet has a barrier layer between a base material and a hot-melt pressure sensitive adhesive layer. The barrier layer is a layer provided to suppress migration of the softener contained in the hot-melt pressure sensitive adhesive layer to the base material.

The pressure sensitive adhesive sheet according to an embodiment of the present invention may have another layer between the base material and the barrier layer and between the barrier layer and the hot-melt pressure sensitive adhesive layer but preferably has a structure in which no other layer is included between the base material and the barrier layer and between the barrier layer and the hot-melt pressure sensitive adhesive layer, and the base material, the barrier layer, and the hot-melt pressure sensitive adhesive layer are directly laminated in this order.

In the pressure sensitive adhesive sheet according to an embodiment of the present invention, a release liner or the like may be provided on the hot-melt pressure sensitive adhesive layer on the opposite side of the barrier layer, and a printable coating layer or the like may be provided on the base material on the opposite side of the barrier layer.

Note that, in the pressure sensitive adhesive sheet according to an embodiment of the present invention, another layer that is not equivalent of the base material, the barrier layer, the hot-melt pressure sensitive adhesive layer, the release liner, and the printable coating layer described above may be included.

Figure 1:
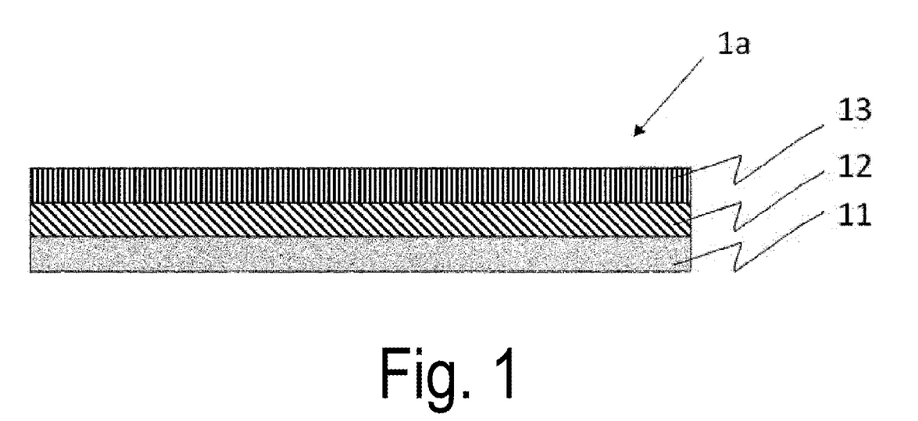
FIG. 1 is a cross-sectional view illustrating a structure of a pressure sensitive adhesive sheet according to a first embodiment of the present invention.

FIG. 1 is a cross-sectional view illustrating a structure of a pressure sensitive adhesive sheet according to a first embodiment of the present invention.

In a pressure sensitive adhesive sheet 1a according to a first embodiment of the present invention, a barrier layer 12 is provided on one face of a base material 11, and a hot-melt pressure sensitive adhesive layer 13 is further provided on the barrier layer 12.

Figure 2:
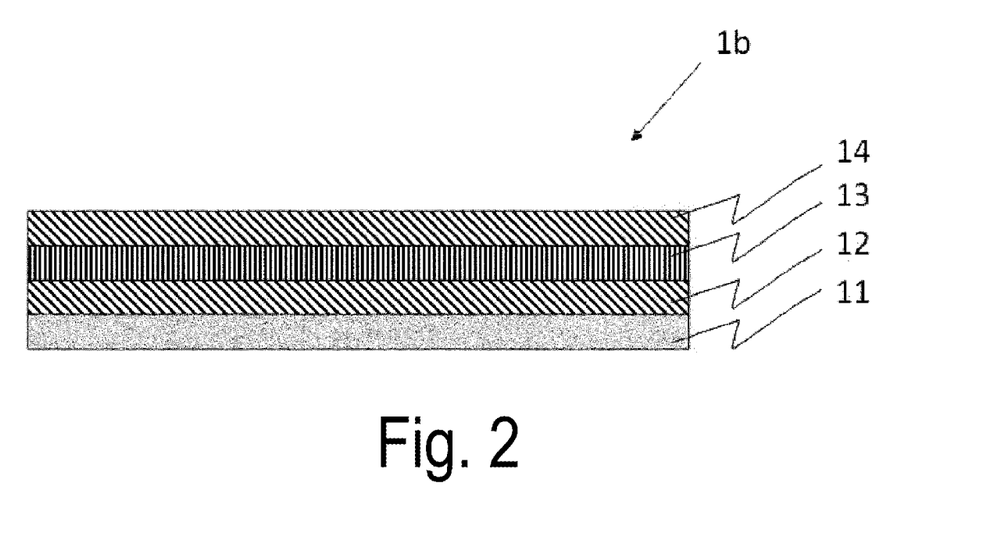
FIG. 2 is a cross-sectional view illustrating a structure of a pressure sensitive adhesive sheet according to a second embodiment of the present invention.

FIG. 2 is a cross-sectional view illustrating a structure of a pressure sensitive adhesive sheet according to a second embodiment of the present invention.

In a pressure sensitive adhesive sheet 1b according to a second embodiment of the present invention, a barrier layer 12 is provided on one face of a base material 11, a hot-melt pressure sensitive adhesive layer 13 is provided on the barrier layer 12, and a release liner 14 is provided on the hot-melt pressure sensitive adhesive layer 13.

Each layer constituting the pressure sensitive adhesive sheet according to an embodiment of the present invention will be described below.

Barrier Layer

The barrier layer contains at least one selected from the group consisting of a polyester-based resin, a polyurethane-based resin, and a polyolefin-based resin, and as necessary, may contain another resin, a cross-linking agent, or another additive.

The thickness of the barrier layer is not particularly limited; however, from the perspective of interlayer adhesion between the barrier layer and the hot-melt pressure sensitive adhesive layer, the thickness is preferably 0.01 µm or greater, more preferably 0.2 µm or greater, and particularly preferably 0.3 µm or greater, and preferably 10 µm or less, more preferably 5 µm or less, and particularly preferably 2 µm or less.

Note that the thickness of the barrier layer is specifically a value measured and calculated on the basis of the method described in the examples below.

The total content of the polyester-based resin, the polyurethane-based resin, and the polyolefin-based resin in the barrier layer is not particularly limited but is preferably 80 mass % or greater, more preferably 90 mass % or greater, even more preferably 95 mass % or greater, and particularly preferably substantially 100 mass %. Note that, in a case where only one selected from the group consisting of a polyester-based resin, a polyurethane-based resin, and a polyolefin-based resin is contained, the content refers to a content of the one that is selected. In a case where two or more selected from the group consisting of a polyester-based resin, a polyurethane-based resin, and a polyolefin-based resin are contained, the content refers to a total content of the two or more selected.

The method of forming the barrier layer is not particularly limited. From the perspective of suppressing migration of the softener in a case where the thickness of the barrier layer is thin in an aspect of the present invention, the method preferably includes application of a solution (coating liquid), in which at least one selected from the group consisting of a polyester-based resin, a polyurethane-based resin, and a polyolefin-based resin (hereinafter, the polyester-based resins, the polyurethane-based resins, and the polyolefin-based resins are also simply referred to as "resins") dissolved in a solvent, onto a base material. That is, the barrier layer is preferably a layer formed by applying a solution (coating liquid) in which a polyester-based resin is dissolved in a solvent onto a base material.

Examples of the solvent used in the method of forming the barrier layer include methanol, ethanol, propanol, butanol, isopropyl alcohol, methyl ethyl ketone, methyl isobutyl ketone, ethyl acetate, toluene, dimethylacetamide, ethylene glycol, ethylene glycol mono-n-propyl ether, propylene glycol monomethyl ether, and propylene glycol monomethyl ether acetate. One of these may be used alone, or two or more may be used in combination.

Among these, from the viewpoint of obtaining a homogeneous solution, methyl ethyl ketone and toluene are preferred.

In the method of forming the barrier layer in another aspect of the present invention, from the viewpoints of environmental effect and safety during application such as prevention of ignition accidents due to static electricity, the method may also include application of an aqueous resin dispersion (coating liquid), in which at least one selected from the group consisting of a polyester-based resin, a polyurethane-based resin, and a polyolefin-based resin is dispersed in water, onto a base material, or application of an aqueous solution (coating liquid) containing at least one selected from the group consisting of a polyester-based resin, a polyurethane-based resin, and a polyolefin-based resin onto a base material. Among these, application of an aqueous resin dispersion, in which at least one selected from the group consisting of a polyester-based resin, a polyurethane-based resin, and a polyolefin-based resin is dispersed in water, onto a base material is preferably included. That is, the barrier layer is a layer formed by application of an aqueous resin dispersion, in which at least one selected from the group consisting of a polyester-based resin, a polyurethane-based resin, and a polyolefin-based resin is dispersed in water, onto a base material. Note that the aqueous resin dispersion refers to a material containing water as a main component and contains not less than 50 mass % of water.

The aqueous resin dispersion, in which at least one selected from the group consisting of a polyester-based resin, a polyurethane-based resin, and a polyolefin-based resin is dispersed in water, may contain the solvent described above, and one type of the solvent may be used alone or a combination of two or more types of the solvents may be used.

Polyester-Based Resin

The polyester-based resin contained in the barrier layer is not particularly limited as long as the polyester-based resin is at least one of a polyester resin or a modified polyester resin; however, the polyester-based resin is typically a resin having an ester bond in a main chain and, from the viewpoint of suppressing migration of the softener, preferably contains a modified polyester resin, and more preferably is a modified polyester resin.

The glass transition temperature of the polyester-based resin is not particularly limited; however, in an aspect of the present invention, from the viewpoint of suppressing migration of the softener, the glass transition temperature is preferably 40° C. or higher, more preferably 55° C. or higher, even more preferably 70° C. or higher, and particularly preferably 80° C. or higher, and from the viewpoint of coating formation, is preferably 130° C. or lower, more preferably 95° C. or lower, even more preferably 90° C. or lower, and particularly preferably 85° C. or lower. Furthermore, in another aspect of the present invention, from the viewpoint of suppressing migration of the softener, the glass transition temperature is preferably 20° C. or higher, more preferably 30° C. or higher, and even more preferably 40° C. or higher, and from the viewpoint of coating formation, is preferably 100° C. or lower, more preferably 90° C. or lower, and even more preferably 80° C. or lower. When the glass transition temperature is lower than 40° C., effect of suppressing migration of the softener may not be achieved. When the glass transition temperature is higher than 130° C., it may become difficult to form a coating due to occurrence of defects.

Note that the glass transition temperature is a value measured and calculated on the basis of the method described in the examples below.

The hydroxyl value of the polyester-based resin is not particularly limited but is preferably 0.5 KOHmg/g or greater, more preferably 1 KOHmg/g or greater, and particularly preferably 2 KOHmg/g or greater, and preferably 10 KOHmg/g or less, more preferably 9 KOHmg/g or less, and particularly preferably 8 KOHmg/g or less.

Note that the hydroxyl value of the polyester-based resin is a value measured and calculated on the basis of the method described in the examples below.

The acid value of the polyester-based resin is not particularly limited. However, in an aspect of the present invention, the acid value is preferably 10 KOHmg/g or less, more preferably 2 KOHmg/g or less, and particularly preferably 1 KOHmg/g or less. In another aspect of the present invention, the acid value is preferably 30 KOHmg/g or greater, more preferably 35 KOHmg/g or greater, and particularly 40 KOHmg/g or greater, and preferably 80 KOHmg/g or less, more preferably 75 KOHmg/g or less, and particularly preferably 70 KOHmg/g or less.

Note that the acid value of the polyester-based resin is a value measured and calculated on the basis of the method described in the examples below.

The number average molecular weight Mn of the polyester-based resin is not particularly limited. However, in an aspect of the present invention, the number average molecular weight Mn is preferably 10000 or greater, and more preferably 20000 or greater, and preferably 100000 or less, and more preferably 50000 or less. In another aspect of the present invention, the number average molecular weight Mn is preferably 1000 or greater, and more preferably 2000 or greater, and preferably 10000 or less, and more preferably 5000 or less.

Polyester Resin

The polyester resin is a copolymer obtained by a polycondensation reaction of an acid component and a diol component or a polyol component.

The polycondensation reaction is performed by an ordinary polyesterification reaction such as a direct esterification method or a transesterification method.

One type of these polyester resins may be used alone, or a combination of two or more types of these polyester resins may be used.

Examples of the acid component include aromatic dicarboxylic acids, such as terephthalic acid, phthalic acid, sulfoterephthalic acid, isophthalic acid, phthalic anhydride, α-naphthalenedicarboxylic acid, 2,6-naphthalenedicarboxylic acid, 5-sodiumsulfoisophthalic acid, 5-potassiumsulfoisophthalic acid, or anhydrides or esters of these; aliphatic dicarboxylic acids, such as pimelic acid, suberic acid, azelaic acid, oxalic acid, sebacic acid, succinic acid, adipic acid, undecylenic acid, dodecane dicarboxylic acid, or anhydrides or esters of these; alicyclic dicarboxylic acids, such as 1,3-cyclohexanedicarboxylic acid, 1,3-cyclopentanedicarboxylic acid, 1,2-cyclohexanedicarboxylic acid, 1,2-cyclopentanedicarboxylic acid, 1,4-cyclohexanedicarboxylic acid, or anhydrides or esters of these. One of these may be used alone, or two or more may be used in combination.

Examples of the diol component or the polyol component include aliphatic glycols, such as ethylene glycol, 1,2-propylene glycol, 1,3-propylene glycol, 1,3-butanediol, 1,4-butanediol, 1,5-pentanediol, 1,6-hexanediol, 1,8-octanediol, 1,9-nonanediol, neopentyl glycol, 3-methylpentanediol, 2,2,3-trimethylpentanediol, diethylene glycol, triethylene glycol, and dipropylene glycol; alicyclic glycols, such as 1,2-cyclohexanediol, 1,2-cyclohexanedimethanol, 1,4-cyclohexanediol, and 1,4-cyclohexanedimethanol; and aromatic glycols, such as p-xylene glycol and bisphenol A. One of these may be used alone, or two or more may be used in combination.

The polyester resin may contain a reactive functional group.

Specific examples of the reactive functional group include a hydroxy group, a carboxyl group, and an amino group.

Note that the reactive functional group may be a group related to a polymerization reaction (i.e., related to main chain formation) or may be a group provided additionally. In the polyester-based resin, a constitutional unit of polyol may have a hydroxy group or a constitutional unit of a carboxylic acid component may have a carboxylic acid, and a residual hydroxy group or residual carboxylic acid of these may be the reactive functional group described above.

Note that the polyester resin may contain an active energy beam polymerizable functional group. The polyester resin having such a structure can be produced by, for example, in a stage at which a polymerization reaction is performed to form a polyester-based resin, allowing a monomer and/or an oligomer (hereinafter, also referred to as "monomer and the like") to coexist with a compound having an active energy beam polymerizable functional group and causing a reaction between this compound and the monomer and the like together with a polymerization reaction of the monomer and the like to introduce this compound into a backbone of a polyester-based resin. Note that, in the present specification, "active energy beam" refers to a beam including an energy quantum among electromagnetic wave or charged particle radiation, i.e., refers to an active light such as ultraviolet rays or an electron beam.

Note that suitable specific examples of a commercially available polyester resin include "Nichigo-POLYESTER TP-220" available from Mitsubishi Chemical Corporation (compound name: saturated copolymer polyester).

Modified Polyester Resin

The modified polyester resin is not particularly limited as long as the modified polyester resin is obtained by modification of the polyester resin described above, and examples thereof include urethane-modified polyester resins, acryl-modified polyester resins, and silicone-modified polyester resins. One of these may be used alone, or two or more may be used in combination. Among these, from the viewpoint of suppressing migration of the softener, a urethane-modified polyester resin is preferred.

Examples of the urethane-modified polyester resin include a polyester resin further containing a urethane bond. The urethane-modified polyester resin can be obtained by, for example, reacting a polyester resin having two or more functional groups, such as hydroxy groups, in one molecule with a polyisocyanate compound.

Specific examples of the urethane-modified polyester resin include polymers (polyesterurethane) obtained by reacting a polyester polyol with various polyisocyanate compounds, the polyester polyol having a hydroxyl group at a terminal of a copolymer obtained by a polycondensation reaction of the acid component and the diol component or the polyol component described above.

As the polyisocyanate compound used in urethane modification of the polyester resin, a polyisocyanate compound having two or more isocyanate groups in one molecule is preferred.

Examples of the polyisocyanate compound having two or more isocyanate groups in one molecule include diisocyanate compounds, triisocyanate compounds, tetraisocyanate compounds, pentaisocyanate compounds, and hexaisocyanate compounds. More specifically, examples include aromatic polyisocyanate compounds, such as tolylene diisocyanate, diphenylmethane diisocyanate, and xylylene diisocyanate; alicyclic isocyanate compounds, such as dicyclohexylmethane-4,4-diisocyanate, bicycloheptane triisocyanate, cyclopentylene diisocyanate, cyclohexylene diisocyanate, methylcyclohexylene diisocyanate, and hydrogenated xylylene diisocyanate; and aliphatic isocyanate compounds, such as pentamethylene diisocyanate, hexamethylene diisocyanate, heptamethylene diisocyanate, trimethylhexamethylene diisocyanate, and lysine diisocyanate. One of these may be used alone, or two or more may be used in combination.

In addition, modified products of these isocyanate compounds can also be used, including biuret products or isocyanurate products, or adducts that are reaction products of these isocyanate compounds with a non-aromatic low molecular weight active hydrogen-containing compound, such as ethylene glycol, trimethylolpropane, or castor oil.

The urethane-modified polyester resin is preferably a urethane-modified polyester resin having a basic structure of aromatic polyester. The basic structure of aromatic polyester has a repeating unit derived from an aromatic compound in a polyester structure of a main chain and, for example, is obtained when one or both of dicarboxylic acid and glycol compounds of some or all of copolymer raw materials are aromatic compound(s).

Note that suitable specific examples of a commercially available urethane-modified polyester resin include "Vylon UR 4800" available from Toyobo Co., Ltd. (compound name: saturated copolymer polyesterurethane).

Polyurethane-Based Resin

The polyurethane-based resin contained in the barrier layer is not particularly limited but typically is a resin obtained by reacting a polyisocyanate component and a polyol component and, as needed, subjected to chain extension in the presence of a chain extender, which is a low molecular weight compound having two or more active hydrogens such as diol or diamine.

The glass transition temperature of the polyurethane-based resin is not particularly limited; however, from the viewpoint of suppressing migration of the softener, the glass transition temperature is preferably 40° C. or higher, more preferably 55° C. or higher, even more preferably 70° C. or higher, and particularly preferably 80° C. or higher, and from the viewpoint of coating formation, is preferably 130° C. or lower, more preferably 95° C. or lower, and particularly preferably 90° C. or lower. When the glass transition temperature is lower than 40° C., effect of suppressing migration of the softener may not be achieved. When the glass transition temperature is higher than 130° C., it may become difficult to form a coating due to occurrence of defects.

Note that the glass transition temperature is a value measured and calculated on the basis of the method described in the examples below.

The acid value of the polyurethane-based resin is not particularly limited but is preferably 1 KOHmg/g or greater, more preferably 5 KOHmg/g or greater, and particularly preferably 8 KOHmg/g or greater, and preferably 50 KOHmg/g or less, more preferably 40 KOHmg/g or less, and particularly preferably 30 KOHmg/g or less.

Note that the acid value of the polyurethane-based resin is a value measured and calculated on the basis of the method described in the examples below.

The number average molecular weight Mn of the polyurethane-based resin is not particularly limited but is preferably 1000 or greater, and more preferably 2000 or greater, and preferably 1000000 or less, and more preferably 500000 or less.

The polyisocyanate component is not particularly limited but is preferably an aliphatic polyisocyanate from the viewpoint of suppressing migration of the softener.

Examples of the aliphatic polyisocyanate include chain aliphatic polyisocyanates and cyclic aliphatic polyisocyanates.

Examples of the chain aliphatic polyisocyanate include trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), 1,5-pentamethylene diisocyanate (PDI), 1,6-hexamethylene diisocyanate (HDI), 2,4,4- or 2,2,4-trimethylhexamethylene diisocyanate, and 2,6-diisocyanate methylcaprate. Among these, HDI is preferable.

Examples of the cyclic aliphatic polyisocyanate include 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanatomethyl-3, 5,5-trimethylcyclohexylisocyanate (IPDI), methylene bis (cyclohexylisocyanate) (4,4'-, 2,4'-, or 2,2'-methylene bis (cyclohexylisocyanate) and trans,trans-substance, trans,cis-substance, and cis,cis-substance of these, or mixtures of these) ($H_{12}$MDI), methylcyclohexane diisocyanate (methyl-2,4-cyclohexane diisocyanate, methyl-2,6-cyclohexane diisocyanate), norbornane diisocyanate (various isomers or mixtures of these) (NBDI), and 1,3- and 1,4-bis(isocyanatomethyl)cyclohexane ($H_6$XDI) (also known as hydrogenated xylylene diisocyanate). Among these, IPDI is particularly preferable.

Examples of the polyol component include polyether polyol, polyester polyol, and polycarbonate polyol.

Examples of the polyether polyol include those obtained by ring-opening homopolymerization or ring-opening copolymerization of alkylene oxide (e.g., alkylene oxide having from 2 to 5 carbons, such as ethylene oxide, propylene oxide, butylene oxide, tetrahydrofuran, 3-methyltetrahydrofuran, and oxetane compounds) using a low molecular weight polyol as an initiator. Specific examples thereof include polyoxyethylene glycol, polyoxypropylene glycol, polyoxyethylene-propylene copolymers, and polyoxytetramethylene glycol (polytetramethylene ether glycol).

The low molecular weight polyol is, for example, a low molecular weight polyol having two or more hydroxyl groups and having a molecular weight of 60 to 400, and examples thereof include low molecular weight diols, such as ethylene glycol, propane diol, 1,4-butylene glycol (1,4-butane diol), 1,6-hexane diol, 1,2-butylene glycol, 1,3-butylene glycol, 1,5-pentane diol, 3-methyl-1,5-pentanediol, neopentyl glycol, alkane (having from 7 to 22 carbons) diol, diethylene glycol, triethylene glycol, dipropylene glycol, cyclohexane dimethanol, alkane-1,2-diol (having from 17 to 20 carbons), 1,4-dihydroxy-2-butene, 2,6-dimethyl-1-octene-3,8-diol, bis(hydroxyethoxy)benzene, xylene glycol, and bis(hydroxyethylene) terephthalate; low molecular weight triols, such as glycerin, 2-methyl-2-hydroxymethyl-1,3-propane diol, 2,4-dihydroxy-3-hydroxymethylpentane, 1,2,6-hexanetriol, trimethylolpropane, 2,2-bis(hydroxymethyl)-3-butanol, and other aliphatic triols (having from 8 to 24 carbons); and low molecular weight polyols having 4 or more hydroxyl groups, such as tetramethylolmethane, D-sorbitol, xylitol, D-mannitol, and D-mannite.

The polyester polyol can be obtained by a known esterification reaction, i.e., a condensation reaction of a polyhydric alcohol and a polybasic acid or a transesterification reaction of a polyhydric alcohol and an alkyl ester of polybasic acid. Examples of the polybasic acid or the alkyl ester thereof include aliphatic dicarboxylic acids, such as adipic acid, sebacic acid, succinic acid, azelaic acid, dimer acid, and dodecanedioic acid; alicyclic dicarboxylic acids, such as hexahydrophthalic acid and tetrahydrophthalic acid; aromatic dicarboxylic acids, such as isophthalic acid, terephthalic acid, ortho-phthalic acid, and naphthalenedicarboxylic acid; dialkyl esters of these (e.g., alkyl esters having from 1 to 6 carbons), acid anhydrides of these, and mixtures of these.

Polyolefin-Based Resin

The polyolefin-based resin contained in the barrier layer is not particularly limited and is typically a homopolymer of an olefin compound or a copolymer of an olefin compound and another compound.

The softening point of the polyolefin resin contained in the barrier layer is not particularly limited; however, from the viewpoint of suppressing migration of the softener, the softening point is preferably 0° C. or higher, more preferably 20° C. or higher, even more preferably 25° C. or higher, and particularly preferably 30° C. or higher, and from the viewpoint of coating formation, preferably 100° C. or lower, more preferably 60° C. or lower, even more preferably 55° C. or lower, and particularly preferably 50° C. or lower. When the softening point is lower than 0° C., effect of suppressing migration of the softener may not be achieved. When the glass transition temperature is higher than 100° C., it may become difficult to form a coating due to occurrence of defects.

Note that the softening point is a value measured and calculated on the basis of the method described in the examples below.

The number average molecular weight Mn of the polyolefin-based resin is not particularly limited but is preferably 1000 or greater, and more preferably 2000 or greater, and preferably 1000000 or less, and more preferably 500000 or less.

Examples of the homopolymer of an olefin compound include homopolymers of α-olefin having from 2 to 20 carbons, such as polyethylene (e.g., low density polyethylene, medium density polyethylene, high density polyethylene, or linear low density polyethylene), polypropylene, polyisobutylene, poly(1-butene), poly(1-pentene), and poly(1-hexene).

Examples of the copolymer of olefin compound include ethylene-propylene copolymers, ethylene-1-butene copolymers, ethylene-1-octene copolymers, and ethylene-1-hexene copolymers.

Furthermore, as the polyolefin-based resin, a polyolefin-based resin in which a polar group has been introduced can be also used. Specific examples of the polyolefin-based resin in which a polar group has been introduced include acid-modified polyolefins, such as maleic anhydride-modified polyethylene, maleic acid-modified polyethylene, acrylic acid-modified polyethylene, maleic anhydride-modified polypropylene, maleic acid-modified polypropylene, maleic anhydride-modified ethylene-propylene copolymer, and acrylic acid-modified polypropylene; ethylene-vinyl acetate copolymers and saponified products thereof, such as ethylene-vinyl chloride copolymers, ethylene-vinylidene chloride copolymers, ethylene-acrylonitrile copolymers, ethylene-methacrylonitrile copolymers, ethylene-vinyl acetate copolymer, ethylene-acrylamide copolymers, ethylene-methacrylamide copolymers, ethylene-acrylic acid copolymers, ethylene-methacrylic acid copolymers, ethylene-maleic acid copolymers, ethylene-methyl (meth)acrylate copolymers, ethylene-ethyl (meth)acrylate copolymers, ethylene-isopropyl (meth)acrylate copolymers, ethylene-(meth)acrylate copolymers, ethylene-isobutyl (meth)acrylate copolymers, ethylene-2-ethylhexyl (meth)acrylate copolymers, ethylene-maleic anhydride copolymers, ethylene-ethyl acrylate-maleic anhydride copolymers, and ethylene-(meth)acrylic acid metal salt copolymers; ethylene or α-olefin-vinyl monomer copolymers, such as ethylene-vinyl propionate copolymers, ethylene-glycidyl (meth)acrylate copolymers, ethylene-ethyl acrylate-glycidyl methacrylate copolymers, and ethylene-vinyl acetate-glycidyl methacrylate copolymers; and chlorinated polyolefins, such as chlorinated polypropylene and chlorinated polyethylene.

Other Resin

As long as the effect of the present invention is not impaired, the barrier layer may contain another resin besides the polyester-based resin, the polyurethane-based resin, and the polyolefin-based resin.

As such another resin, a known resin used for barrier layer formation can be used based on a rubber, a resin, and the like to form a hot-melt pressure sensitive adhesive layer provided on the barrier layer described below.

Specific examples of such another resin include thermoplastic resins, such as acrylic resins, acryl-modified polyolefin resins, chlorinated polyolefin resins, vinyl chloride-vinyl acetate copolymers, polyamide resins, and rubber-based resins; and thermosetting resins such as epoxy resin. One of these may be used alone, or two or more may be used in combination.

The content of such another resin in the barrier layer is not particularly limited but is preferably 20 mass % or less, more preferably 10 mass % or less, even more preferably 5 mass % or less, and particularly preferably 1 mass % or less, and the barrier layer may contain no such another resin.

Cross-Linking Agent

As long as the effect of the present invention is not impaired, the barrier layer may contain a cross-linking agent.

Examples of the cross-linking agent include polyisocyanate compounds having two or more isocyanate groups in one molecule. More specifically, examples include aromatic polyisocyanates, such as tolylene diisocyanate, diphenylmethane diisocyanate, and xylylene diisocyanate; alicyclic isocyanate compounds, such as dicyclohexylmethane-4,4'-diisocyanate, bicycloheptane triisocyanate, cyclopentylene diisocyanate, cyclohexylene diisocyanate, methylcyclohexylene diisocyanate, and hydrogenated xylylene diisocyanate; and aliphatic isocyanates, such as hexamethylene diisocyanate, trimethylhexamethylene diisocyanate, and lysine diisocyanate. One of these may be used alone, or two or more may be used in combination.

In addition, as the cross-linking agent, modified products of the polyisocyanate compounds described above can also be used, including biuret products or isocyanurate products, or adducts that are reaction products of these polyisocyanate compounds with a non-aromatic low molecular weight active hydrogen-containing compound, such as ethylene glycol, trimethylolpropane, or castor oil.

Note that suitable specific examples of commercially available cross-linking agents include "Coronate L" (isocyanate-based compound) available from Tosoh Corporation.

The content of the cross-linking agent in the barrier layer is not particularly limited but is preferably 15 mass % or less, more preferably 10 mass % or less, and particularly preferably 8 mass % or less.

Other Additives

As long as the effect of the present invention is not impaired, the barrier layer may contain another additive besides the cross-linking agent.

Such another additive can be appropriately selected based on the use of the barrier layer, and examples thereof include fillers, pigments, colorants, metal powders, electrical conducting materials, softeners (plasticizers), solvents, surfactants, dispersing agents, neutralizers, thickeners, wetting agents, antifoaming agents, lubricants, antistatic agents, antiseptics, antioxidants, and UV absorbers. One of these may be used alone, or two or more may be used in combination.

The content of such another additive in the barrier layer is not particularly limited but is preferably 20 mass % or less, more preferably 10 mass % or less, even more preferably 5 mass % or less, and particularly preferably 1 mass % or less.

Base Material

A base material can be appropriately selected based on the use of the pressure sensitive adhesive sheet, and examples thereof include resin films such as oriented polypropylene resin films and synthetic paper, and paper base materials.

From the viewpoint of effect of the present invention, a base material containing at least one of paper or a polyolefin-based resin is preferred. Note that examples of the polyolefin-based resin include polyethylene, polypropylene, and ethylene-propylene copolymers.

The thickness of the base material is appropriately set based on the use of the pressure sensitive adhesive sheet; however, from the viewpoints of handleability and economic efficiency, the thickness is preferably from 5 to 250 μm, more preferably from 15 to 200 μm, and particularly preferably from 25 to 150 μm.

Note that the thickness of the base material is specifically a value measured and calculated on the basis of the method same as that for the thickness of the barrier layer.

Furthermore, in a case where a resin film or laminated paper is used as a base material, from the viewpoint of further improving interlayer adhesion between the base material and the barrier layer, the surface of the resin film or laminated paper may be subjected to surface treatment, such as an oxidation method or a roughening method.

Examples of the oxidation method include a corona discharge treatment method, a plasma treatment method, chromium acid oxidation (wet), a flame treatment, a hot-air treatment, and an ozone-ultraviolet light irradiation treatment.

Examples of the roughening method include a sandblasting method and a solvent treatment method.

The surface treatment is appropriately selected based on the type of the base material; however, from the viewpoint of further improving interlayer adhesion between the base material and the barrier layer and from the viewpoint of operability, a corona discharge treatment method is preferred.

Resin Film

Examples of a resin contained in the resin film include polyolefin-based resins, such as polyethylene, polypropylene, and ethylene-propylene copolymers; polyester-based resins, such as polyethylene terephthalate, polybutylene terephthalate, and polyethylene naphthalate; urethane-based resins, such as polyurethane and acryl-modified polyurethane; vinyl-based resins, such as polyvinyl chloride, polyvinylidene chloride, polyvinyl alcohol, ethylene-vinyl acetate copolymers, and ethylene-vinyl alcohol copolymers; polystyrene resins; acrylonitrile-butadiene-styrene (ABS) resins; cellulosetriacetate resins; polycarbonate resins; acetate resins; polyamide resins; and polyimide resins. One of these may be used alone, or two or more may be used in combination. Furthermore, as the resin film, synthetic paper may be used.

The content of the resin in the resin film is not particularly limited but is preferably 80 mass % or greater, more preferably 90 mass % or greater, even more preferably 95 mass % or greater, and particularly preferably substantially 100 mass %.

The resin film may further contain additives such as fillers, UV absorbers, light stabilizers, antioxidants, antistatic agents, slip agents, anti-blocking agents, and colorants, besides the resin described above.

The resin film may be a laminate in which multiple resin films are laminated or may be a foam.

Paper Base Material

Examples of paper contained in the paper base material include tissue paper, wood containing paper, wood-free paper, impregnated paper, coat paper, art paper, vegetable parchment, and glassine paper. One of these may be used alone, or two or more may be used in combination.

The content of the paper in the paper base material is not particularly limited but is preferably 80 mass % or greater, more preferably 90 mass % or greater, even more preferably 95 mass % or greater, and particularly preferably substantially 100 mass %.

The density of the paper in the paper base material is not particularly limited but is preferably 0.90 g/cm³ or greater, more preferably 0.95 g/cm³ or greater, and even more preferably 0.98 cm³ or greater, and preferably 1.5 g/cm³ or less, more preferably 1.3 g/cm³ or less, and even more preferably 1.2 g/cm³ or less.

Hot-Melt Pressure Sensitive Adhesive Layer

For the hot-melt pressure sensitive adhesive layer, a softener is added to a rubber and/or acryl, and a thermoplastic resin of olefin or the like, and the mixture is heated and melted, and applied. As necessary, a tackifier and other additives may be contained.

In one aspect of the present invention, the hot-melt pressure sensitive adhesive layer is preferably a layer containing a rubber and a tackifier.

The thickness of the hot-melt pressure sensitive adhesive layer is not particularly limited but is preferably from 1 to 200 μm, more preferably from 5 to 150 μm, and particularly preferably from 10 to 100 μm.

Note that the thickness of the hot-melt pressure sensitive adhesive layer is specifically a value measured and calculated on the basis of the method same as that for the thickness of the barrier layer.

Rubber

Examples of rubber contained in the hot-melt pressure sensitive adhesive layer include natural rubbers, such as RSS-No. 1 to 4, SMR-5L, SMR-20, and CV-60; and synthetic rubbers, such as styrene-isoprene-styrene block copolymer (SIS) rubbers, styrene-butadiene rubbers, butadiene rubbers, chloroprene rubbers, and nitrile rubbers. One of these may be used alone, or two or more may be used in combination.

Among these, a styrene-isoprene-styrene block copolymer (SIS) rubber is preferred.

Note that, since many rubbers have large molecular weights, initial pressure sensitive adhesion and coatability are improved by mechanically reducing the molecular weight by a mixing roll, a Bunbury kneader, or a kneader.

The weight average molecular weight of the rubber is not particularly limited; however, from the viewpoints of coating operation of the hot-melt pressure sensitive adhesive and pressure sensitive adhesion properties of the pressure sensitive adhesive sheet, the weight average molecular weight is preferably from 100000 to 500000. When the weight average molecular weight of the rubber is not less than the lower limit, adequate cohesion can be obtained. When the weight average molecular weight is not greater than the upper limit, coatability can be improved by reducing the viscosity of the hot-melt pressure sensitive adhesive.

Softener

A softener contained in the hot-melt pressure sensitive adhesive layer is to improve coatability by reducing the viscosity of the hot-melt pressure sensitive adhesive, and examples thereof include petroleum-based softeners, such as process oil and extender oil; plant oil-based softeners such as tall oil; and synthetic plasticizers such as dibasic acid ester-based plasticizers. One of these may be used alone, or two or more may be used in combination.

Among these, process oil, such as paraffin-based process oil, naphthene-based process oil, aromatic process oil, or other known process oil, is preferred.

The content of the softener in the hot-melt pressure sensitive adhesive layer is not particularly limited but is preferably from 20 to 200 parts by mass per 100 parts by mass of the rubber.

Tackifier

A tackifier that can be contained in the hot-melt pressure sensitive adhesive layer serves a role in enhancing initial tack and pressure sensitive adhesive force.

Examples of the tackifier include rosin-based resins; ester compounds of rosin-based resins by pentaerythritol; terpene resins including polymers of terpenes, such as α-pinene and β-pinene, and copolymers of these; terpene modified bodies, such as terpene phenol resins; petroleum resins, such as aromatic hydrocarbon resins and aliphatic hydrocarbon resins (e.g., aliphatic/aromatic copolymer petroleum resins) and hydrides of these; and phenolic resins, such as coumarone-indene resins and alkylphenol acetylene resins. One of these may be used alone, or two or more may be used in combination.

The content of the tackifier is not particularly limited but is preferably from 20 to 200 parts by mass per 100 parts by mass of the rubber. When the content of the tackifier is not less than the lower limit, good initial peel adhesion can be achieved. When the content is not greater than the upper limit, target cohesion can be achieved.

Other Additives

Examples of other additives that can be contained in the hot-melt pressure sensitive adhesive layer include fillers such as calcium carbonate and clay; pigments; and antioxidants. One of these may be used alone, or two or more may be used in combination.

Examples of the device to mix the components described above include Bunbury kneaders, kneaders, and twin screw extruders. One of these may be used alone, or two or more may be used in combination.

In a case where the molecular weight of the rubber needs to be lowered, mixing of a softener, a tackifier, and other additives may be performed after the molecular weight of the rubber is lowered, or mixing may be performed simultaneously at the time of lowering of the molecular weight of the rubber.

The temperature at the time of mixing is not particularly limited; however, from the perspective of homogeneity, the temperature is preferably not lower than the softening point of the tackifier, and from the viewpoint of prevention of deterioration of the rubber, the temperature is preferably 200° C. or lower.

Release Liner

The release liner is typically formed on a side of the hot-melt pressure sensitive adhesive layer, which is the side opposite to the barrier layer side.

In an aspect of the present invention, the pressure sensitive adhesive sheet preferably further includes a release liner on the hot-melt pressure sensitive adhesive layer on the opposite side of the barrier layer.

Examples of the release liner include a release sheet subjected to a double-sided release treatment and a release sheet subjected to a single-sided release treatment.

Examples of the release treatment include application of a release agent on a surface of a base material for a release liner.

Examples of the base material for a release liner include resin films, paper base materials, laminated paper, and synthetic paper, which can be used as base materials contained in pressure sensitive adhesive sheets. One of these may be used alone, or two or more may be used in combination.

Examples of the release agent include olefin-based resins, isoprene-based resins, butadiene-based resins, silicone-based resins, long-chain alkyl-based resins, alkyd-based resins, and fluorine-based resins. One of these may be used alone, or two or more may be used in combination.

The thickness of the release liner is not particularly limited but is preferably from 10 to 200 μm, and more preferably from 25 to 150 μm.

Note that the thickness of the release liner is specifically a value measured and calculated on the basis of the method same as that for the thickness of the barrier layer.

Printable Coating Layer

The printable coating layer is typically formed on a side of the base material, which is the side opposite to the barrier layer side.

The resin material of the printable coating layer is not particularly limited as long as the resin material can form a printable coating layer having good adhesion to a base material and good adhesion of a printing ink. Examples thereof include acrylic resins, styrene-based resins, polyester urethane-based resins, polyester-based resins, polyurethane-based resins, polyol-based resins, polyvinyl alcohol, polyvinyl pyrrolidone, cellulose derivatives, acetate derivatives, polyvinyl chloride-based resins, and polyimide-based resins. One of these may be used alone, or two or more may be used in combination.

Among these, a polyester urethane resin is preferred. The polyester urethane resin may be appropriately polymerized by using a cross-linking agent and a cross-linking promoter.

In a case where the base material on which a printable coating layer is formed is a resin film, such as synthetic paper, the content of the resin material in the printable coating layer is not particularly limited but is preferably 80 mass % or greater, more preferably 90 mass % or greater, even more preferably 95 mass % or greater, and particularly preferably substantially 100 mass %.

Examples of additives that can be added to the printable coating layer include pigments, colorants, metal powders, electrical conducting materials, softeners (plasticizers), solvents, surfactants, dispersing agents, neutralizers, thickeners, wetting agents, antifoaming agents, lubricants, antistatic agents, cross-linking agents, antiseptics, antioxidants, and UV absorbers. One of these may be used alone, or two or more may be used in combination.

The content of the additive in the printable coating layer is not particularly limited but is preferably 20 mass % or less, more preferably 10 mass % or less, and even more preferably 5 mass % or less.

Note that, in a case where the base material on which a printable coating layer is formed is a paper-containing base material, such as a paper base material or laminated paper, the content of an additive (e.g., inorganic material) in the printable coating layer becomes greater, and the content of a resin material in the printable coating layer becomes less, compared to a case where the base material is a resin film, such as synthetic paper.

The thickness of the printable coating layer is not particularly limited but is preferably from 10 to 600 nm, and more preferably from 30 to 200 nm. Note that the thickness of the printable coating layer is specifically a value measured and calculated on the basis of the method same as that for the thickness of the barrier layer.

Method for Producing Pressure Sensitive Adhesive Sheet

The method for producing the pressure sensitive adhesive sheet is not particularly limited, and a preferred example will be described below.

For example, the adhesive sheet 1a of FIG. 1 can be produced by applying a raw material that can form a barrier layer containing at least one selected from the group consisting of a polyester-based resin, a polyurethane-based resin, and a polyolefin-based resin described above onto a base material 11 by a known coating method and drying to form a barrier layer 12, and then further applying the hot-melt pressure sensitive adhesive described above onto the barrier layer 12 by a known coating method to form a hot-melt pressure sensitive adhesive layer 13.

Furthermore, the pressure sensitive adhesive sheet 1b of FIG. 2 can be produced by laminating a release liner 14 on the hot-melt pressure sensitive adhesive layer 13 of the pressure sensitive adhesive sheet 1a of FIG. 1 produced by the method described above.

Furthermore, the adhesive sheet 1b of FIG. 2 can be also produced by adhering the hot-melt pressure sensitive adhesive layer 13 formed on the release liner 14 by the method described above and the barrier layer 12 formed on the base material 11 by the method described above.

Furthermore, a printable coating layer (not illustrated) may be formed on the base material 11 of the pressure sensitive adhesive sheet 1a of FIG. 1 or the base material 11 of the pressure sensitive adhesive sheet 1b of FIG. 2 produced by the method described above.

In an aspect of the present invention, from the viewpoints of achieving good coatability and improving working efficiency, the raw material that can form the barrier layer is preferably applied onto a base material in a form of a solution obtained by adding a solvent.

The solvent is not particularly limited; however, because the raw material that can form the barrier layer contains at least one selected from the group consisting of a polyester-based resin, a polyurethane-based resin, and a polyolefin-based resin described above, the solvent is preferably an organic solvent.

Examples of the solvent include methanol, ethanol, propanol, butanol, isopropyl alcohol, methyl ethyl ketone, methyl isobutyl ketone, ethyl acetate, toluene, dimethylacetamide, ethylene glycol, ethylene glycol mono-n-propyl ether, propylene glycol monomethyl ether, and propylene glycol monomethyl ether acetate. One of these may be used alone, or two or more may be used in combination. Among these, from the viewpoint of obtaining a homogeneous solution, methyl ethyl ketone and toluene are preferred.

In another aspect of the present invention, from the viewpoints of environmental effect and safety during application such as prevention of ignition accidents due to static electricity, the raw material that can form the barrier layer may be applied onto the base material in a form of at least one selected from the group consisting of a polyester-based resin, a polyurethane-based resin, and a polyolefin-based resin being dispersed in water (aqueous resin dispersion), or in a form of at least one selected from the group consisting of a polyester-based resin, a polyurethane-based resin, and a polyolefin-based resin being dissolved in water (aqueous solution). Among these, application onto the base material is preferably performed in a form in which the resin is dissolved in water.

The aqueous resin dispersion and the aqueous solution may each contain the solvent described above, and one type of the solvent may be used alone or a combination of two or more types of the solvents may be used. The aqueous resin dispersion and the aqueous solution each preferably contain no solvent besides water.

Furthermore, from the viewpoints of achieving good coatability and improving working efficiency, the raw material that can form the printable coating layer is preferably applied onto the base material in a form of a solution obtained by adding a solvent.

The solvent is not particularly limited and is appropriately selected based on the type of the raw material that can form the printable coating layer described above.

Examples of the coating method of the raw material that can form the barrier layer and the raw material that can form the printable coating layer include a spin coating method, a spray coating method, a bar coating method, a knife coating method, an air-knife coating method, a roll knife coating method, a roll coating method, a blade coating method, a die coating method, a gravure coating method, a lip coating method, and a curtain coating method.

Examples of the coating method of the raw material that can form the hot-melt pressure sensitive adhesive layer include a spray coating method, a bar coating method, a knife coating method, an air-knife coating method, a roll knife coating method, a roll coating method, a blade coating method, a die coating method, a gravure coating method, a lip coating method, and a curtain coating method.

Furthermore, the drying temperature and the drying time of the coating formed after application of the barrier layer and the printable coating layer are not particularly limited and can be appropriately set.

EXAMPLES

The present invention will be specifically described with reference to examples below, but the present invention is not limited to the following examples.

Physical property values below are values measured by the following methods.

(1) Degree of Discoloration (Lightness Index Ratio)

For a paper base material face of each pressure sensitive adhesive sheet sample (as a base material, a paper base material (product name: OK Kinfuji one side art, available from Oji Paper Co., Ltd.; thickness: 75 μm) was used) each obtained in Examples 1 to 3 and Comparative Examples 1 to 5, lightness index (L*) was measured (as "L*(initial-a)"), and after storage in an environment at a temperature of 60° C. for 10 days, lightness index (L*) was measured (as "L*(10D-a)"), and then lightness index ratio "L*(10D-a)/L*(initial)" was calculated. The results are shown in Table 1.

Note that the lightness index (L*) was measured in accordance with JIS K 5600-4-5:1999 (measurement instrument: Spectrophotometer SE 6000, available from Nippon Denshoku Industries Co., Ltd., was used).

Note that "lightness index (L*)" indicates degree of lightness, and a larger numerical value indicates the color being lighter, and a smaller numerical value indicates the color being darker. Furthermore, when "lightness index ratio" is closer to 100, the degree of discoloration is smaller and thus preferred.

(2) Degree of Discoloration (Color Difference)

For a paper base material face of pressure sensitive adhesive sheet sample (Examples 16 to 20 and Comparative Example 21 used coat paper (thickness: 89 μm) as the base material, and Examples 21 to 23 and Comparative Example 22 used wood-free paper (thickness: 73 μm) as the base material) each obtained in Examples 16 to 23 and Comparative Examples 21 and 22, L* value, a* value, and b* value of L*a*b* color space were measured (as "L*(initial-b), a*(initial-b), b*(initial-b)"), and after storage in an environment at a temperature of 70° C. for 7 days, L* value, a* value, and b* value of L*a*b* color space were measured (as "L*(10D-b), a*(10D-b), b*(10D-b)"), and thus degree of discoloration ΔE (color difference) was calculated by the following equation. The results are shown in Tables 6 and 7.

$$\Delta E^* = [(L^*(\text{initial-}b) - L^*(10D-b))^2 + (a^*(\text{initial-}b) - a^*(10D-b))^2 + (b^*(\text{initial-}b) - b^*(10D-b))^2]^{1/2}$$

Note that the L* value, a* value, and b* value are based on the L*a*b* color space standardized by the International Commission on Illumination (CIE) in 1976. The L*a*b* color space is employed in JIS Z 8781-4:2013. For the measurement, the Spectrophotometer SE 6000, available from Nippon Denshoku Industries Co., Ltd., was used, and reflected light was measured from the base material face side (side opposite to the release paper face).

Note that "degree of discoloration ΔE*" indicates degree of discoloration, and a larger numerical value indicates a greater change in a color tone, and a smaller numerical value indicates a smaller change in a color tone. Furthermore, when "degree of discoloration ΔE*" is closer to 0, the degree of discoloration is smaller and thus preferred.

(3) Degree of Deformation (Height Difference with Respect to Reference (mm))

For pressure sensitive adhesive sheet sample (synthetic paper (product name: Yupo, available from Yupo Corporation; thickness: 80 μm) was used as the base material) each obtained in Examples 4 to 6 and 24 to 30 and Comparative Examples 6 to and 23, degree of deformation was measured.

Note that the degree of deformation in Examples 4 to 6 and Comparative Examples 6 to 10 were each calculated by placing a pressure sensitive adhesive sheet sample (square: 100 mm×100 mm), from which the release liner was released, on a cylinder having a diameter of 20 mm in a manner that the pressure sensitive adhesive layer was arranged on a top side and allowing to stand still at 23° C. for 7 days, then measuring the height difference with respect to the reference of the four corners of the square, and determining the average thereof. The results are shown in Table 2.

The degree of deformation in Examples 24 to 30 and Comparative Example 23 were each calculated by allowing a pressure sensitive adhesive sheet sample (square: 50 mm×50 mm), from which the release liner was released, to stand still in a manner that the pressure sensitive adhesive layer was disposed on a top side at 50° C. for 1 hour, then measuring the height difference with respect to the reference of the four corners of the square, and determining the average thereof. The results are indicated in Table 8.

Note that, when "height difference with respect to reference (mm)" is closer to 0, the degree of deformation is smaller and thus preferred.

(4) Degree of Deformation (Elongation (μm))

For pressure sensitive adhesive sheet sample (oriented polypropylene resin film (product name: ALPHAN SY101, available from Oji F-Tex Co., Ltd.; thickness: 50 μm) was used as the base material) each obtained in Examples 7 to 15 and Comparative Examples 11 to 25, elongation was measured.

Note that, for the elongation, after the pressure sensitive adhesive sheet sample (square: 100 mm×100 mm) was allowed to stand still at 60° C. for 7 days, the length of the base material stuck out from the release liner (elongation (μm)) was measured. The results are indicated in Tables 3 to 5.

Note that, when the elongation is smaller, the degree of deformation is smaller and thus preferred.

(5) Thickness of Each Layer (Barrier Layer, Base Material, Hot-Melt Pressure Sensitive Adhesive Layer, and Release Liner)

The thickness of each layer (barrier layer, base material, hot-melt pressure sensitive adhesive layer, and release liner) was measured using a constant pressure thickness gauge (Model number: "PG-02J", standard specifications: in accordance with JIS K 6783:1994, JIS Z 1702:1994, and JIS Z 1709:1995) available from Teclock Co., Ltd.

(6) Glass Transition Temperature (Tg) of Resin

The glass transition temperature (° C.) of the resin used for forming the barrier layer was measured using a differential scanning calorimeter (product name "DSC Q2000" available from TA Instruments Japan Inc.) at a heating rate of 20° C./min in accordance with JIS K 7121. The results are indicated in Tables 1 to 5.

(7) Softening Point

The softening point (° C.) of the resin used for forming the barrier layer was measured according to the softening point test method (ring and ball method) stipulated in JIS K 5601-2-2:1999.

(8) Hydroxyl Value of Resin

The hydroxyl value (KOHmg/g) of the resin used for forming the barrier layer was measured in accordance with JIS K 0070:1992.

(9) Acid Value of Resin

The acid value (KOHmg/g) of the resin used for forming the barrier layer was measured in accordance with JIS K 0070:1992.

Note that the resins and the cross-linking agents used in the present Examples and Comparative Examples are as follows.

(1) "Polyester resin 1" (glass transition temperature: 67° C.; hydroxyl value: 6 KOHmg/g; acid value: less than 2 KOHmg/g)
(2) "Urethane-modified polyester resin" (glass transition temperature: 83° C.; hydroxyl value: from 2 to 3 KOHmg/g; acid value: less than 1 KOHmg/g)
(3) "Vinyl chloride-vinyl acetate copolymer" (glass transition temperature: 73° C.)
(4) "Acrylic resin (ethyl acrylate-methyl methacrylate-butyl methacrylate copolymer)" (glass transition temperature: 40° C.)
(5) "Polyvinylpyrrolidone (PVP)" (glass transition temperature: 86° C.)
(6) "Polyester resin 2" (glass transition temperature: 46° C.; hydroxyl value: 5 KOHmg/g; acid value: 50 KOHmg/g)
(7) "Polyurethane-based resin" (glass transition temperature: 85° C.; acid value: 18 KOHmg/g)
(8) "Polyolefin-based resin" (softening point: 40° C.)
(9) "Cross-linking agent: isocyanate-based compound"

Example 1

Preparation of Raw Materials for Barrier Layer Formation

The "polyester resin" (glass transition temperature: 67° C.; hydroxyl value: 6 KOHmg/g; acid value: less than 2 KOHmg/g) was mixed with toluene and methyl ethyl ketone as solvents, and thus a material for barrier layer formation (coating liquid), the material having a solid concentration of 10 mass % and being a solvent solution, was prepared.

Preparation of Hot-Melt Pressure Sensitive Adhesive

A pressure sensitive adhesive composition was prepared by uniformly mixing 100 parts of a styrene-isoprene-styrene block copolymer (SIS) rubber (styrene amount: 15 mass %; diblock amount: 40 mass %), 150 parts of a tackifier (aliphatic/aromatic copolymer petroleum resin; softening point: 102° C.), 65 parts of softener (paraffin-based process oil), and 3 parts of antioxidant (hindered phenol-based).

Production of Pressure Sensitive Adhesive Sheet

As the base material, a paper base material (product name: OK Kinfuji one side art, available from Oji Paper Co., Ltd.; thickness: 75 μm) was used.

On a face of the paper base material, the prepared material for barrier layer formation (coating liquid) was applied, a coating film was formed, the coating film was dried at 70° C. for 1 minute, and thus a barrier layer having a thickness of 1 μm was formed.

Then, on a release liner (material having a silicone-based release agent applied on a poly(ethylene terephthalate) base material; thickness: 50 μm), the pressure sensitive adhesive composition melted at 140° C. was applied by a die coater, and thus a hot-melt pressure sensitive adhesive layer having a thickness of 20 μm was formed. Furthermore, the barrier layer face of the paper base material and the hot-melt pressure sensitive adhesive layer were laminated, and thus a pressure sensitive adhesive sheet was produced.

For the produced pressure sensitive adhesive sheet, lightness indexes (L*) were measured immediately after the production (within 8 hours from the production) and 10 days after the production, and degree of discoloration (lightness index ratio) was calculated. The evaluation results are indicated in Table 1 below.

Example 2 and Comparative Examples 2 to 4

A pressure sensitive adhesive sheet was produced in the same manner as in Example 1 except for using "polyester resin" as the resin used in the material for barrier layer formation of Example 1 and using a resin and coating liquid listed in Table 1 below in place of using the "liquid mixture of toluene and methyl ethyl ketone (mass ratio: 50:50; form: solvent solution)" as the coating liquid used to form the barrier layer. Lightness indexes (L*) were measured immediately after the production and 10 days after the production, and degree of discoloration (lightness index ratio) was calculated. The results are indicated in Table 1.

Example 3

A pressure sensitive adhesive sheet was produced in the same manner as in Example 2 except for adding a cross-linking agent listed in Table 1 below in a solid content of 6 parts by mass with respect to 100 parts by mass of the urethane-modified polyester resin in Example 2. Lightness indexes (L*) were measured immediately after the production and 10 days after the production, and degree of discoloration (lightness index ratio) was calculated. The results are indicated in Table 1.

Comparative Example 1

A pressure sensitive adhesive sheet was produced in the same manner as in Example 1 except for forming no barrier layer and directly forming the hot-melt pressure sensitive adhesive layer on the base material in Example 1. Lightness indexes (L*) were measured immediately after the production and 10 days after the production, and degree of discoloration (lightness index ratio) was calculated. The results are indicated in Table 1.

Examples 4 to 6 and Comparative Examples 5 to 8

A pressure sensitive adhesive sheet was produced in the same manner as in each of Examples 1 to 3 and Comparative Examples 1 to 4 except for using synthetic paper (product name: Yupo, available from Yupo Corporation; thickness: 80 μm) in place of using the paper base material as the base material in each of Examples 1 to 3 and Comparative Examples 1 to 4. For each of the obtained pressure sensitive adhesive sheet samples, degree of deformation (height difference with respect to reference (mm)) was measured. The results are shown in Table 2.

Examples 7 to 9 and Comparative Examples 9 to 12

A pressure sensitive adhesive sheet was produced in the same manner as in each of Examples 1 to 3 and Comparative Examples 1 to 4 except for using an oriented polypropylene resin film (product name: ALPHAN SY101, available from Oji F-Tex Co., Ltd.; thickness: 50 nm) in place of using the paper base material as the base material in each of Examples 1 to 3 and Comparative Examples 1 to 4. For each of the obtained pressure sensitive adhesive sheet samples, degree of deformation (elongation (μm)) 7 days later was measured. The results are presented in Table 3.

Examples 10 to 12 and Comparative Examples 13 to 16

A pressure sensitive adhesive sheet was produced in the same manner as in each of Examples 7 to 9 and Comparative Examples 9 to 12 except for setting the thickness of the barrier layer to 0.5 μm in place of setting the thickness of the barrier layer to 1 nm in each of Examples 7 to 9 and Comparative Examples 9 to 12. For each of the obtained pressure sensitive adhesive sheet samples, degree of deformation (elongation (μm)) 7 days later was measured. The results are presented in Table 4.

Examples 13 to 15 and Comparative Examples 17 to 20

A pressure sensitive adhesive sheet was produced in the same manner as in each of Examples 7 to 9 and Comparative Examples 9 to 12 except for setting the thickness of the barrier layer to 0.1 μm in place of setting the thickness of the barrier layer to 1 nm in each of Examples 7 to 9 and Comparative Examples 9 to 12. For each of the obtained pressure sensitive adhesive sheet samples, degree of deformation (elongation (μm)) 7 days later was measured. The results are indicated in Table 5.

Example 16

A pressure sensitive adhesive sheet was produced in the same manner as in Example 1 except for using an aqueous resin dispersion obtained by dispersing the polyester resin 2 in water and having a solid content concentration of 10 mass % in place of using the coating liquid obtained by dissolving the resin in the "liquid mixture of toluene and methyl ethyl ketone (mass ratio: 50:50; form: solvent solution)" as the coating liquid used to form the barrier layer in Example 1, using coat paper (thickness: 89 μm; density: 1.0 g/cm$^3$) in place of using the paper base material as the base material, and applying the coating liquid in a manner that the amount of coating became 1.0 g/m$^2$. For the obtained pressure sensitive adhesive sheet, L* value, a* value, and b* value were measured immediately after the production (within 8 hours from the production) and 7 days after the production, and degree of discoloration (ΔE*) was calculated. Note that the coat paper was one-side coat paper, and the barrier layer was formed on a side opposite to the coat face. The results are indicated in Table 6.

Examples 17 to 20

A pressure sensitive adhesive sheet was produced in the same manner as in Example 16 except for using an aqueous resin dispersion obtained by dispersing the resin listed in Table 6 below (in a case where the resin 2 was used, the mass ratio of the resin 1 to the resin 2 was 1:1) in water and having a solid content concentration of 10 mass % in place of using the aqueous resin dispersion obtained by dispersing the "polyester resin 2" in water as the coating liquid used in the material for barrier layer formation in Example 16. L* value, a* value, and b* value were measured immediately after the production and 7 days after the production, and degree of discoloration (ΔE*) was calculated. The results are indicated in Table 6.

Comparative Example 21

A pressure sensitive adhesive sheet was produced in the same manner as in Example 16 except for forming no barrier layer and directly forming the hot-melt pressure sensitive adhesive layer on the base material in Example 16. L* value, a* value, and b* value were measured immediately after the production and 7 days after the production, and degree of discoloration (ΔE*) was calculated. The results are indicated in Table 6.

Examples 21 to 23

A pressure sensitive adhesive sheet was produced in the same manner as in Example 16 except for using an aqueous resin dispersion obtained by dispersing the resin listed in Table 7 below (in a case where the resin 2 was used, the mass ratio of the resin 1 to the resin 2 was 1:1) in water and having a solid content concentration of 10 mass % in place of using the aqueous resin dispersion obtained by dispersing the "polyester resin 2" in water as the coating liquid used in the material for barrier layer formation in Example 16, and using wood-free paper (thickness: 73 μm; density: 0.9 g/cm$^3$) in place of using the coat paper as the base material. For each of the obtained pressure sensitive adhesive sheet samples, L* value, a* value, and b* value were measured immediately after the production (within 8 hours from the production) and 7 days after the production, and degree of discoloration (ΔE*) was calculated. The results are indicated in Table 7.

Comparative Example 22

A pressure sensitive adhesive sheet was produced in the same manner as in Examples 21 to 23 except for forming no barrier layer and directly forming the hot-melt pressure sensitive adhesive layer on the base material in Examples 21 to 23. L* value, a* value, and b* value were measured immediately after the production and 7 days after the production, and degree of discoloration (ΔE*) was calculated. The results are indicated in Table 7.

Examples 24 to 30

A pressure sensitive adhesive sheet was produced in the same manner as in Example 16 except for using an aqueous resin dispersion obtained by dispersing the resin listed in Table 8 below (in a case where the resin 2 was used, the mass ratio of the resin 1 to the resin 2 was 1:1) in water and having a solid content concentration of 10 mass % in place of using the aqueous resin dispersion obtained by dispersing the polyester resin 2 in water in Example 16, and using synthetic paper (product name: Yupo, available from Yupo Corporation; thickness: 80 μm) in place of using the coat paper as the base material. For each of the obtained pressure sensitive adhesive sheet samples, degree of deformation (height difference with respect to reference (mm)) was measured. The results are indicated in Table 8.

Comparative Example 23

A pressure sensitive adhesive sheet was produced in the same manner as in Examples 24 to 30 except for forming no barrier layer and directly forming the hot-melt pressure sensitive adhesive layer on the base material in Examples 24 to 30. For each of the obtained pressure sensitive adhesive sheet samples, degree of deformation (height difference with respect to reference (mm)) was measured. The results are indicated in Table 8.

TABLE 1

| | Barrier layer | | | | | | | Evaluation results Degree of discoloration |
|---|---|---|---|---|---|---|---|---|
| | Resin | | Cross-linking agent | Coating liquid used for barrier layer formation | | Thickness | Base | (lightness index ratio) L'(10D)/L'(initial) |
| | Type | Glass transition temperature Tg (°C.) | Addition amount (part by mass)*¹ | Used solvent | Form | (μm) | material | (%) |
| Example 1 | Polyester resin 1 | 67 | — | Liquid mixture of toluene and methyl ethyl ketone (mass ratio: 50:50) | Solvent solution | 1 | Paper | 99.8 |
| Example 2 | Urethane-modified polyester resin | 83 | — | Liquid mixture of toluene and methyl ethyl ketone (mass ratio: 50:50) | Solvent solution | 1 | | 99.8 |
| Example 3 | Urethane-modified polyester resin | 83 | 6 | Liquid mixture of toluene and methyl ethyl ketone (mass ratio: 50:50) | Solvent solution | 1 | | 99.8 |
| Comparative Example 1 | | | | — | | | | 99.1 |
| Comparative Example 2 | Vinyl chloride-vinyl acetate copolymer | 73 | — | Liquid mixture of toluene and methyl ethyl ketone (mass ratio: 50:50) | Solvent solution | 1 | | 99.4 |
| Comparative Example 3 | Acrylic resin | 40 | — | Water | Aqueous resin dispersion | 1 | | 99.4 |
| Comparative Example 4 | Polyvinylpyrrolidone (PVP) | 86 | — | Water | Aqueous solution | 1 | | 98.9 |

*¹Addition amount with respect to 100 parts by mass of the resin in the barrier layer (solid content)

TABLE 2

| | Barrier layer | | | | | | | Evaluation results Degree of deformation |
|---|---|---|---|---|---|---|---|---|
| | Resin | | Cross-linking agent | Coating liquid used for barrier layer formation | | Thickness | | (height difference with respect to reference (mm)) |
| | Type | Glass transition temperature Tg (°C.) | Addition amount (part by mass)*¹ | Used solvent | Form | (μm) | Base material | Four point average |
| Example 4 | Polyester resin 1 | 67 | — | Liquid mixture of toluene and methyl ethyl ketone (mass ratio: 50:50) | Solvent solution | 1 | Synthetic paper | 23.75 |
| Example 5 | Urethane-modified polyester resin | 83 | — | Liquid mixture of toluene and methyl ethyl ketone (mass ratio: 50:50) | Solvent solution | 1 | | 20 |

TABLE 2-continued

| | Barrier layer | | | | | | | Evaluation results Degree of deformation |
|---|---|---|---|---|---|---|---|---|
| | Resin | | Cross-linking agent | Coating liquid used for barrier layer formation | | Thickness | | (height difference with respect to reference (mm)) |
| | Type | Glass transition temperature Tg (° C.) | Addition amount (part by mass)*1 | Used solvent | Form | (μm) | Base material | Four point average |
| Example 6 | Urethane-modified polyester resin | 83 | 6 | Liquid mixture of toluene and methyl ethyl ketone (mass ratio: 50:50) | Solvent solution | 1 | | 22.5 |
| Comparative Example 5 | | | — | | | | | 250 |
| Comparative Example 6 | Vinyl chloride-vinyl acetate copolymer | 73 | — | Liquid mixture of toluene and methyl ethyl ketone (mass ratio: 50:50) | Solvent solution | 1 | | 40 |
| Comparative Example 7 | Acrylic resin | 40 | — | Water | Aqueous resin dispersion | 1 | | 250 |
| Comparative Example 8 | Polyvinylpyrrolidone (PVP) | 86 | — | Water | Aqueous solution | 1 | | 126 |

*1Addition amount with respect to 100 parts by mass of the resin in the barrier layer (solid content)

TABLE 3

| | Barrier layer | | | | | | | Evaluation results |
|---|---|---|---|---|---|---|---|---|
| | Resin | | Cross-linking agent | Coating liquid used for barrier layer formation | | Thickness | | Degree of deformation (elongation |
| | Type | Glass transition temperature Tg (° C.) | Addition amount (part by mass)*1 | Used solvent | Form | (μm) | Base material | (μm)) |
| Example 7 | Polyester resin 1 | 67 | — | Liquid mixture of toluene and methyl ethyl ketone (mass ratio: 50:50) | Solvent solution | 1 | Oriented polypropylene resin film | Less than 10 |
| Example 8 | Urethane-modified polyester resin | 83 | — | Liquid mixture of toluene and methyl ethyl ketone (mass ratio: 50:50) | Solvent solution | 1 | | Less than 10 |
| Example 9 | Urethane-modified polyester resin | 83 | 6 | Liquid mixture of toluene and methyl ethyl ketone (mass ratio: 50:50) | Solvent solution | 1 | | Less than 10 |
| Comparative Example 9 | | | — | | | | | 420 |
| Comparative Example 10 | Vinyl chloride-vinyl acetate copolymer | 73 | — | Liquid mixture of toluene and methyl ethyl ketone (mass ratio: 50:50) | Solvent solution | 1 | | Less than 10 |
| Comparative Example 11 | Acrylic resin | 40 | — | Water | Aqueous resin dispersion | 1 | | 295 |
| Comparative Example 12 | Polyvinylpyrrolidone (PVP) | 86 | — | Water | Aqueous solution | 1 | | Less than 10 |

*1Addition amount with respect to 100 parts by mass of the resin in the barrier layer (solid content)

TABLE 4

| | Barrier layer | | | | | | | Evaluation results |
|---|---|---|---|---|---|---|---|---|
| | Resin | | Cross-linking agent | | | | | |
| | | Glass transition temperature | Addition amount (part by | Coating liquid used for barrier layer formation | | Thickness | | Degree of deformation (elongation |
| | Type | Tg (° C.) | mass)*¹ | Used solvent | Form | (μm) | Base material | (μm)) |
| Example 10 | Polyester resin 1 | 67 | — | Liquid mixture of toluene and methyl ethyl ketone (mass ratio: 50:50) | Solvent solution | 0.5 | Oriented polypropylene resin film | 50 |
| Example 11 | Urethane-modified polyester resin | 83 | — | Liquid mixture of toluene and methyl ethyl ketone (mass ratio: 50:50) | Solvent solution | 0.5 | | Less than 10 |
| Example 12 | Urethane-modified polyester resin | 83 | 6 | Liquid mixture of toluene and methyl ethyl ketone (mass ratio: 50:50) | Solvent solution | 0.5 | | Less than 10 |
| Comparative Example 13 | | | | — | | | | 420 |
| Comparative Example 14 | Vinyl chloride-vinyl acetate copolymer | 73 | — | Liquid mixture of toluene and methyl ethyl ketone (mass ratio: 50:50) | Solvent solution | 0.5 | | Less than 10 |
| Comparative Example 15 | Acrylic resin | 40 | — | Water | Aqueous resin dispersion | 0.5 | | 420 |
| Comparative Example 16 | Polyvinylpyrrolidone (PVP) | 86 | — | Water | Aqueous solution | 0.5 | | 100 |

*¹: Addition amount with respect to 100 parts by mass of the resin in the barrier layer (solid content)

TABLE 5

| | Barrier layer | | | | | | | Evaluation results |
|---|---|---|---|---|---|---|---|---|
| | Resin | | Cross-linking agent | | | | | |
| | | Glass transition temperature | Addition amount (part by | Coating liquid used for barrier layer formation | | Thickness | | Degree of deformation (elongation |
| | Type | Tg (° C.) | mass)*¹ | Used solvent | Form | (μm) | Base material | (μm)) |
| Example 13 | Polyester resin 1 | 67 | — | Liquid mixture of toluene and methyl ethyl ketone (mass ratio: 50:50) | Solvent solution | 0.1 | Oriented polypropylene resin film | 250 |
| Example 14 | Urethane-modified polyester resin | 83 | — | Liquid mixture of toluene and methyl ethyl ketone (mass ratio: 50:50) | Solvent solution | 0.1 | | 110 |
| Example 15 | Urethane-modified polyester resin | 83 | 6 | Liquid mixture of toluene and methyl ethyl ketone (mass ratio: 50:50) | Solvent solution | 0.1 | | 100 |
| Comparative Example 17 | | | | — | | | | 420 |
| Comparative Example 18 | Vinyl chloride-vinyl acetate copolymer | 73 | — | Liquid mixture of toluene and methyl ethyl ketone (mass ratio: 50:50) | Solvent solution | 0.1 | | 420 |
| Comparative Example 19 | Acrylic resin | 40 | — | Water | Aqueous resin dispersion | 0.1 | | 460 |
| Comparative Example 20 | Polyvinylpyrrolidone (PVP) | 86 | — | Water | Aqueous solution | 0.1 | | 420 |

*¹: Addition amount with respect to 100 parts by mass of the resin in the barrier layer (solid content)

TABLE 6

| | Barrier layer | | | | | | | | Evaluation results |
|---|---|---|---|---|---|---|---|---|---|
| | Resin 1 | | Resin 2 | | Coating liquid used for barrier layer formation | | Coating amount | | Degree of discoloration |
| | Type | Glass transition temperature Tg (C) or softening point (° C.)*2 | Type | Glass transition temperature Tg (° C.) or softening point (° C.)*2 | Diluent | Form | (g/m²) | Base material | ΔE* |
| Example 16 | Polyester resin 2 | 46 | — | | Water | Aqueous resin dispersion | 1.0 | Coat paper | 0.57 |
| Example 17 | Polyurethane resin | 85 | — | | Water | Aqueous resin dispersion | 1.0 | | 0.35 |
| Example 18 | Polyolefin resin | 40 | — | | Water | Aqueous resin dispersion | 1.0 | | 0.55 |
| Example 19 | Polyester resin 2 | 46 | Polyurethane resin | 85 | Water | Aqueous resin dispersion | 1.0 | | 0.46 |
| Example 20 | Polyester resin 2 | 46 | Polyolefin resin | 40 | Water | Aqueous resin dispersion | 1.0 | | 0.56 |
| Comparative Example 21 | | | | | | — | | | 2.30 |

*2: Refers to the glass transition temperature Tg (° C.) for a polyester resin or a polyurethane resin, and refers to the softening point (° C.) for a polyolefin resin.

TABLE 7

| | Barrier layer | | | | | | | | Evaluation results |
|---|---|---|---|---|---|---|---|---|---|
| | Resin 1 | | Resin 2 | | Coating liquid used for barrier layer formation | | Coating amount | | Degree of discoloration |
| | Type | Glass transition temperature Tg (° C.) | Type | Glass transition temperature Tg (° C.) | Diluent | Form | (g/m²) | Base material | ΔE* |
| Example 21 | Polyester resin 2 | 46 | — | — | Water | Aqueous resin dispersion | 1.0 | Wood-free paper | 6.28 |
| Example 22 | Polyester resin 2 | 46 | — | — | Water | Aqueous resin dispersion | 2.0 | | 5.89 |
| Example 23 | Polyester resin 2 | 46 | Polyurethane resin | 85 | Water | Aqueous resin dispersion | 1.0 | | 4.93 |
| Comparative Example 22 | | | | | | — | | | 8.48 |

TABLE 8

| | Barrier layer | | | | | | | | Evaluation results |
|---|---|---|---|---|---|---|---|---|---|
| | Resin 1 | | Resin 2 | | Coating liquid used for barrier layer formation | | Coating amount | | Degree of deformation (height difference with respect to reference (mm)) |
| | Type | Glass transition temperature Tg (° C.) or softening point (° C.)*2 | Type | Glass transition temperature Tg (° C.) or softening point (° C.)*2 | Diluent | Form | (g/m²) | Base material | Four point average |
| Example 24 | Polyester resin 2 | 46 | Polyurethane resin | 85 | Water | Aqueous resin dispersion | 1.0 | Synthetic paper | 1.0 |
| Example 25 | Polyester resin 2 | 46 | Polyurethane resin | 85 | Water | Aqueous resin dispersion | 0.7 | | 3.1 |

TABLE 8-continued

| | Barrier layer | | | | | | | Evaluation results | |
|---|---|---|---|---|---|---|---|---|---|
| | Resin 1 | | Resin 2 | | Coating liquid used for barrier layer formation | | Coating amount | | Degree of deformation (height difference with respect to reference (mm)) |
| | Type | Glass transition temperature Tg (° C.) or softening point (° C.)*2 | Type | Glass transition temperature Tg (° C.) or softening point (° C.)*2 | Diluent | Form | (g/m²) | Base material | Four point average |
| Example 26 | Polyester resin 2 | 46 | Polyurethane resin | 85 | Water | Aqueous resin dispersion | 0.4 | | 7.8 |
| Example 27 | Polyester resin 2 | 46 | — | — | Water | Aqueous resin dispersion | 1.0 | | 5.1 |
| Example 28 | Polyurethane resin | 85 | — | — | Water | Aqueous resin dispersion | 1.0 | | 1.0 |
| Example 29 | Polyolefin resin | 40 | — | — | Water | Aqueous resin dispersion | 1.0 | | 9.1 |
| Example 30 | Polyester resin 2 | 46 | Polyolefin resin | 40 | Water | Aqueous resin dispersion | 1.0 | | 6.0 |
| Comparative Example 23 | | | | | — | | | | 10 or greater |

*2: Refers to the glass transition temperature Tg (° C.) for a polyester resin or a polyurethane resin, and refers to the softening point (° C.) for a polyolefin resin.

As is clear from Tables 1 to 8, by providing the barrier layer containing at least one selected from the group consisting of a polyester-based resin, a polyurethane-based resin, and a polyolefin-based resin between the base material and the hot-melt pressure sensitive adhesive layer, migration of the softener contained in the hot-melt pressure sensitive adhesive layer to the base material was suppressed, and discoloration and deformation of the base material was suppressed.

INDUSTRIAL APPLICABILITY

The pressure sensitive adhesive sheet according to an embodiment of the present invention can be used as a pressure sensitive adhesive sheet used in a wide variety of use such as labels for display, labels for decoration, packaging films, window films, labels for electromagnetic shielding, packaging, and sheets for electrical equipment.

REFERENCE SIGNS LIST 1a, 1b Pressure sensitive adhesive sheet
11: Base material
12 Barrier layer
13 Hot-melt pressure sensitive adhesive layer
14 Release liner

The invention claimed is:

1. A pressure sensitive adhesive sheet comprising a base material and a hot-melt pressure sensitive adhesive layer containing a softener, the pressure sensitive adhesive sheet further comprising a barrier layer disposed between the base material and the hot-melt pressure sensitive adhesive layer, the barrier layer comprising at least one selected from the group consisting of a polyester-based resin and a polyurethane-based resin,
wherein the polyester-based resin is at least one of a polyester resin or a modified polyester resin,
wherein a total content of the polyester-based resin and/or the polyurethane-based resin in the barrier layer is at least 80 mass %,
wherein the hot-melt pressure sensitive adhesive layer is a layer comprising a rubber and a tackifier.

2. The pressure sensitive adhesive sheet according to claim 1, wherein the polyester-based resin and the polyurethane resin each have a glass transition temperature of from 40 to 130° C., and the polyolefin resin has a softening point of from 0 to 100° C.

3. The pressure sensitive adhesive sheet according to claim 1, wherein the polyester-based resin has a glass transition temperature of from 20 to 100° C.

4. The pressure sensitive adhesive sheet of claim 1, wherein the base material comprises at least one of paper or an olefin-based resin.

5. The pressure sensitive adhesive sheet according to claim 4, wherein the base material comprises the paper having a density of greater than 0.9 g/cm³.

6. The pressure sensitive adhesive sheet according to claim 5, wherein the density of the paper is from 0.9 to 1.5 g/cm³.

7. Pressure sensitive adhesive sheet of claim 1, wherein the barrier layer has a thickness of from 0.01 to 10 μm.

8. The pressure sensitive adhesive sheet of claim 1, wherein the polyester-based resin has a glass transition temperature of from 30 to 90° C.

9. The pressure sensitive adhesive sheet of claim 1, further comprising a release liner on the hot-melt pressure sensitive adhesive layer on an opposite side of the barrier layer.

* * * * *